United States Patent [19]
Grant

[11] 3,986,651
[45] Oct. 19, 1976

[54] CONCAVE TAPE GUIDE

[75] Inventor: Fred F. Grant, Bellflower, Calif.

[73] Assignee: Xerox Corporation, Stamford, Conn.

[22] Filed: Oct. 4, 1974

[21] Appl. No.: 511,974

[52] U.S. Cl. .............................. 226/95; 226/195; 226/196
[51] Int. Cl.² ..................................... B65H 17/30
[58] Field of Search .................. 226/7, 95, 97, 195, 226/196

[56] References Cited
UNITED STATES PATENTS

| | | | |
|---|---|---|---|
| 3,420,424 | 1/1969 | Barbeau | 226/97 |
| 3,723,981 | 3/1973 | Stange | 226/95 |
| 3,871,597 | 3/1975 | LaMens | 226/97 X |

*Primary Examiner*—Richard A. Schacher
*Attorney, Agent, or Firm*—James J. Ralabate; Michael J. Colitz; Franklyn C. Weiss

[57] ABSTRACT

A concave web guide is disclosed wherein the direction of motion of a web may be changed by a concave web guide which contacts the convex surface of the web. This contact is maintained through the use of a vacuum supplied through spaces in the web guide surface. To minimize contact, air under high pressure emanates from small holes in the guide surface creating an air bearing. This concave web guide may be used in a single capstan symmetrical web feeding system wherein all elements contact the same surface of the web and is particularly applicable to magnetic tape drive systems.

6 Claims, 10 Drawing Figures

CONCAVE TAPE GUIDE

BACKGROUND OF THE INVENTION

This invention relates to web feeding systems and more particularly to a concave web guide which contacts the outside or convex surface of the web. The use of this web guide makes possible the design of a symmetrical, single capstan web feeding system wherein the characteristics of the system are independent of the direction of motion of the web and all elements of the system contact the same surface of the web. This invention is particularly applicable to magnetic tape drive systems.

The standard technique for changing the direction of motion of a web of material or a strip of magnetic tape is to wrap it around a circular web guide. To minimize the amount of friction between guide and tape, these guides typically are roller guides or air bearing guides. In either case, the tape is wrapped around the guide and the guide contacts the tape at the tape's inner surface. The result is a change of direction of the magnetic tape motion with no longitudinal compliance of the tape. It is not desirable for a guide to contact the oxide surface of the magnetic tape since loss of information may result. Therefore, most tape drives are designed so that all elements of the drive except the read/write head contact the non-oxide surface. Some examples of web guides are shown in U.S. Pat. No. 2,908,495.

A typical prior art tape drive comprises a capstan which pulls the magnetic tape across a read/write head. A tape guide is located on the opposite side of the head from the capstan to position the tape properly as it passes the read/write head. On either end of this feed system, the magnetic tape is fed through tapered buffer chambers or "pucker pockets," around additional guides, and through vacuum chambers before being spooled onto takeup reels. This system is not symmetrical since there is a capstan on one side of the head and a guide on the other. There are several disadvantages inherent in a non-symmetrical tape handling system.

One disadvantage is that the force available to accelerate the tape in a backward direction is in general less than in a forward direction. The system is designed so that, in the forward direction, the capstan pulls the tape across the read/write head. Since a typical inter-record gap on a magnetic tape is one half inch, and since the magnetic tape stops at about the center of this gap, it can be seen that the capstan must exert enough force on the magnetic tape to accelerate it up to operating speed within a quarter inch of longitudinal motion. The capstan, pucker pockets, and vacuum chambers are designed to achieve this capability in the forward direction. However, in the reverse direction, since the capstan cannot push the tape past the read/write heads, the tape must be accelerated by the longitudinal forces supplied by the pucker pocket and vacuum chamber. These forces are typically less and, therefore, the magnetic tape drive may not read properly in a reverse direction or at least comprises asymmetrical tape dynamics. Reverse direction reading is required in error checking and back spacing operations.

Another problem associated with non-symmetrical tape drive systems is that during long periods of high speed tape motion, the read/write head tends to be heated by friction with the tape. When the tape stops, the head may tend to stick to the tape, and considerable force is required to pull the tape from the head. In some systems, the force exerted by the pucker pocket and vacuum chamber in the reverse direction is not sufficient to pull the magnetic tape from the head, thus causing the system to halt. A solution to this problem is to have a "forward hitch" designed into the system. Since a capstan can exert more force on the tape than the pucker pocket and vacuum chamber can, when it is required to move the tape in a reverse direction, the tape will be initially pulled in a forward direction a slight amount to break the tape free from the head and then the tape will be moved in the reverse direction. Of course, this slows down the response time of the system.

A symmetrical tape drive could be designed wherein each side of one vacuum capstan would contact the leading and trailing portions of the magnetic tape, and wherein circular roller or air bearing tape guides would be used to guide the magnetic tape to the vacuum capstan. However, these tape guides would contact the oxide surface of the magnetic tape and therefore comprise a potential source of damage to the oxide and recorded information.

SUMMARY OF THE INVENTION

In overcoming the disadvantages of the prior art, the present invention contemplates the use of two concave tape guides in a symmetrical tape handling system.

Each concave tape guide comprises a concave surface with a width slightly greater than the width of the tape. This concave surface is contained between two planes spaced slightly apart from the concave surface. A vacuum is provided behind the concave surface creating a flow of air from the concave side of the concave tape guide, through the gap between the guide surface and the planes, and into the area behind the tape guide. This flow of air pulls the tape into the concave area and against the concave surface of the tape guide. However, contact is minimized by an air bearing which is created by the escape of pressurized air from small holes in the concave surface. Thus, the direction of motion of the magnetic tape is changed by the use of a concave tape guide which contacts the outside or convex surface of the tape as distinguished from typical circular tape guides which contact the inside or concave surface of the tape.

Two such concave tape guides may be used in a tape drive to create a symmetrical tape drive system. In this system two circular guides are used to position the tape with respect to the read/write head. Two concave tape guides are used to pull the tape into position where it may simultaneously contact two sides of a vacuum capstan. From there, the tape goes through buffering devices such as pucker pockets and vacuum chambers to stabilize the flow of tape to the take-up reels. Through the use of these concave tape guides a symmetrical system may be designed wherein all elements of the tape drive (with the exception of the read/write head) contact the non-oxide surface of the magnetic tape.

It is therefore an object of this invention to provide a concave web guide which changes the direction of motion of the web in a non-compliant manner by contacting or coming into close proximity with the outside or convex surface of the web.

It is a further object of this invention to provide a symmetrical web feeding system in which all elements of the system come into contact or in close proximity with the same surface of the web.

DETAILED DESCRIPTION OF THE INVENTION

Figure 1:
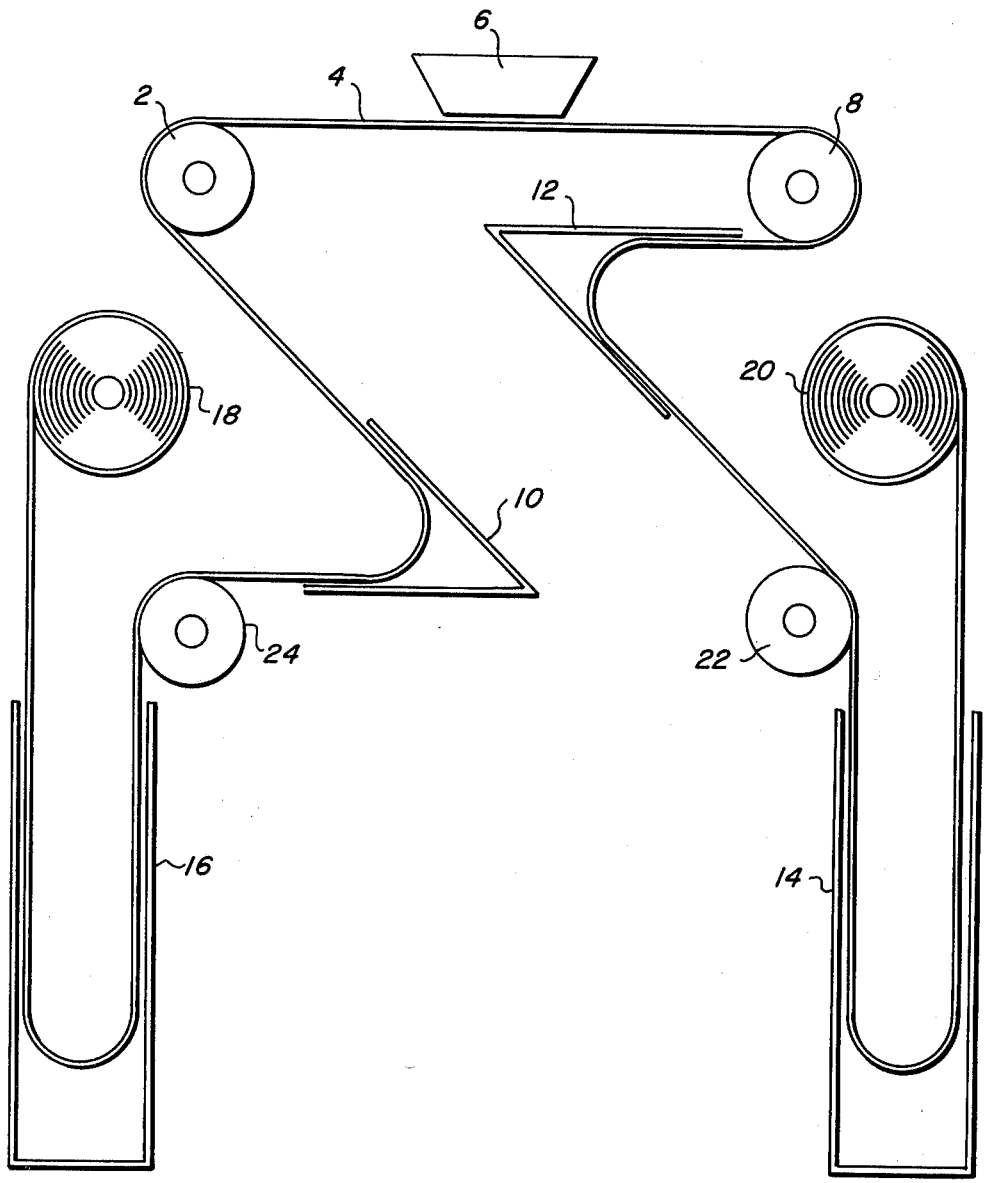
FIG. 1 is a simplified schematic diagram of a prior art web feeding system.

FIG. 1 is a simplified schematic of a typical prior art tape drive system showing the Capstan 2 pulling the Magnetic Tape 4 across Read/Write Head 6. Guide 8 and Capstan 2 position the Tape properly with respect to Read/Write Head 6. Pucker Pockets 10 and 12 are provided to decrease the length of Magnetic Tape that must be accelerated when the system goes from a "stop" to a "run" condition. Thus, the Capstan 2 must accelerate that length of Magnetic Tape that extends from the Capstan 2 around Guide 8 to Pucker Pocket 12. Without the Pucker Pocket, the length of Tape to be accelerated would extend from the Capstan 2 around Guide 8 and through the length of the Vacuum Chamber 14. In a reverse direction, with the Capstan 2 revolving clockwise, Tape is supplied from Pucker Pocket 10 to the Capstan 2. The force pulling the Tape 4 past Head 6 is supplied by Pucker Pocket 12. Since the force supplied by Pucker Pocket 12 is far less than that which can be supplied by Capstan 2, it is seen that the system cannot accelerate Magnetic Tape as well in the reverse direction. Vacuum Chambers 14 and 16 stablize the flow of Tape to Take-Up Reels 18 and 20. All elements of this tape drive, with the exception of the Read/Write Head, contact the non-oxide surface of the Magnetic Tape.

Figure 2:
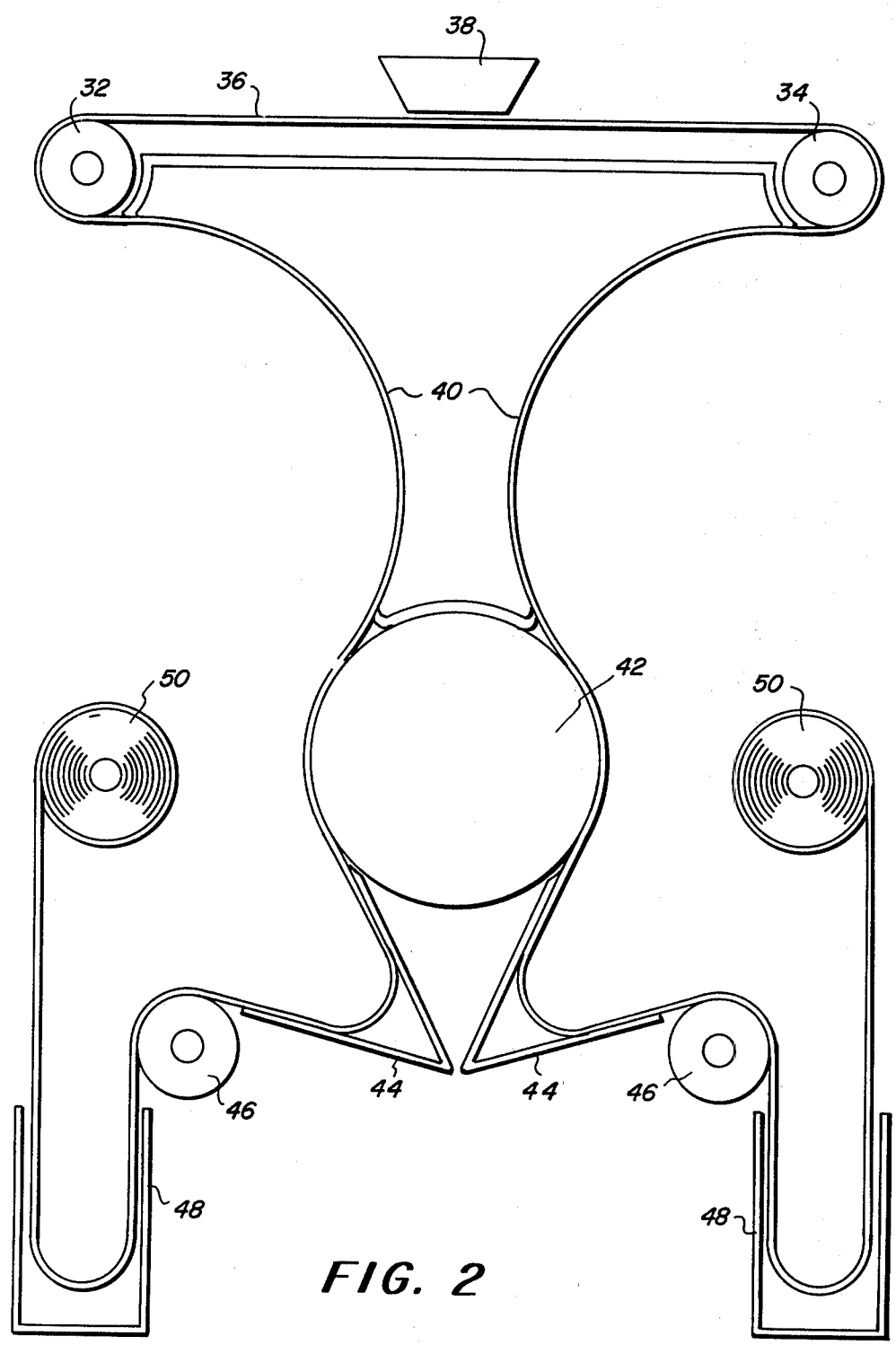
FIG. 2 is a simplified schematic diagram of the preferred embodiment of a symmetrical web feeding system incorporating two concave web guides.

FIG. 2 is a simplified schematic diagram of a symmetrical tape drive system utilizing two Concave Tape Guides. Two circular air bearing Guides 32 and 34 position the Magnetic Tape 36 with respect to the Read/Write Head 38. Two Concave Tape Guides 40 conduct Tape from the Vacuum Capstan 42 to Guide 32 and from Guide 34 to Vacuum Capstan 42 or from Vacuum Capstan 42 around Guides 34 and 32 back to the Vacuum Capstan 42. Since this system is symmetrical the tape drive characteristics of the system are equal in both directions. Pucker Pockets 44, Guides 46, Vacuum Chambers 48 and Take-Up Reels 50 are provided.

A symmetrical tape drive system could have been arranged by providing circular air bearing guides at the inner concave surface of the Magnetic Tape between Vacuum Capstan 42 and Guide 32 and between Vacuum Capstan 42 and Guide 34. However, these two guides would have contacted the oxide surface of the Magnetic Tape 36. Using the proposed Concave Tape Guide 40 allows for a symmetrical tape drive system without the necessity of having a guide act against the oxide surface of the Magnetic Tape.

Figure 3:
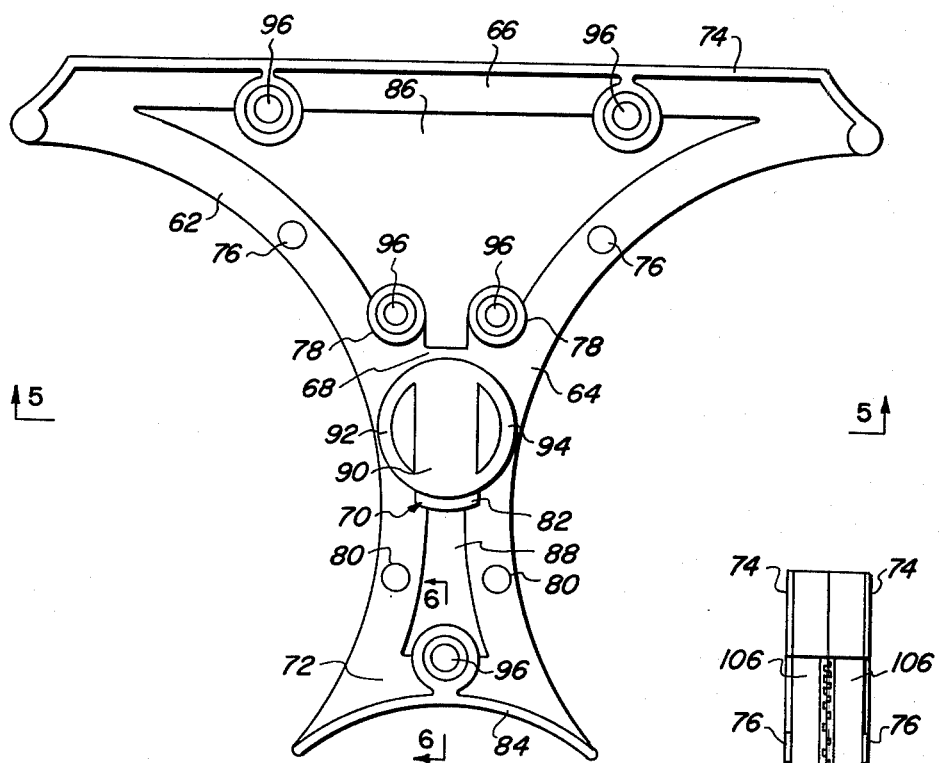
FIG. 3 is a top view of the preferred embodiment showing two concave tape guides combined into a single structural unit.
Figure 6:
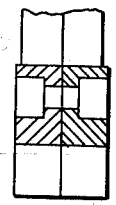
FIG. 6 is a diagram of the mounting hole construction.

FIG. 3 is a top view showing two Concave Tape Guides combined into a single structural Tape Guide Unit. The left Guide 62 and the right Guide 64 are connected by four Cross Pieces 66, 68, 70 and 72.

The Tape Guide Unit is contained between two planes, each of which is separated from the Tape Guide Unit by spacers 74 through 84. The planes, Tape Guides, and Cross Pieces create Cavities 86 and 88 which communicate with each other through a Tube 90 and with a vacuum source. Because of Spacers 74 through 80, a uniform gap exists between Tape Guides 62 and 64 and the planes above and below the Tape Guides. Because of the vacuum in the Cavities 86 and 88, air will flow from the outside of the Tape Guides, through the gap and into Cavities 86 and 88, pulling the Magnetic Tape into contact with Concave Tape Guide 62 and 64. Cavities 92 and 94 communicate with a source of compressed air which is fed through channels, not shown, internal to the Tape Guides 62 and 64. This air emanates from small holes in the surface of the Tape Guide creating an air bearing and largely preventing contact between the Magnetic Tape and the Tape Guide surface. Five Mounting Holes 96 are provided to secure the Tape Guide Unit to its mounting plane.

Figure 4:
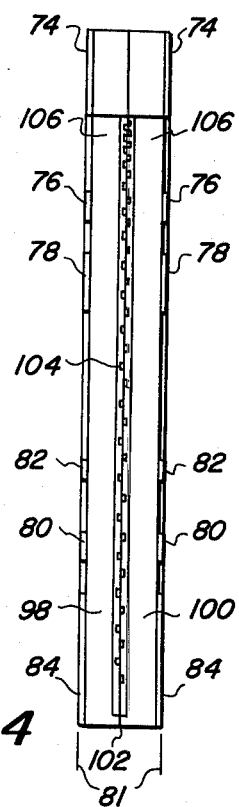
FIG. 4 is a side view of the concave tape guide.

FIG. 4 is a side view of the Concave Tape Guide Units. In the preferred embodiment the Upper Half 98 and Lower Half 100 of the Tape Guide Unit are identical plastic parts bonded together at Seam 102. Along this seam, small Holes 104 communicate with a source of compressed air to form an air bearing on which the Magnetic Tape rides to minimize its contacting Concave Tape Guide Surface 106. Spacers 74 through 84 are also shown in this figure, and are used to separate the Planes 81 from the Upper Half 98 and Lower Half 100.

Figure 5:
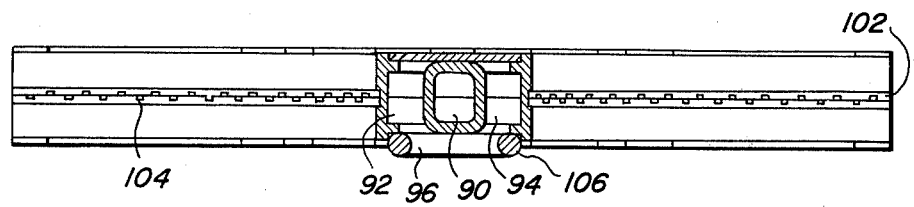
FIG. 5 is a cut-away end view of the concave tape guide unit.

FIG. 5 is a cut away end view of the central section of FIG. 3 showing the construction of the air passages. Tube 90 communicates between the two Vacuum Chambers. Chambers 92 and 94 communicate through a Space 96 which further communicates with a source of compressed air. This compressed air is fed through Channels, not shown, to small Holes 104 lying along the Seam 102. Compressed air emanating from Holes 104 minimize the contact between the Magnetic Tape and the Concave Tape Guide Surface. Grommet 106 prevents leakage of compressed air.

Figure 7:
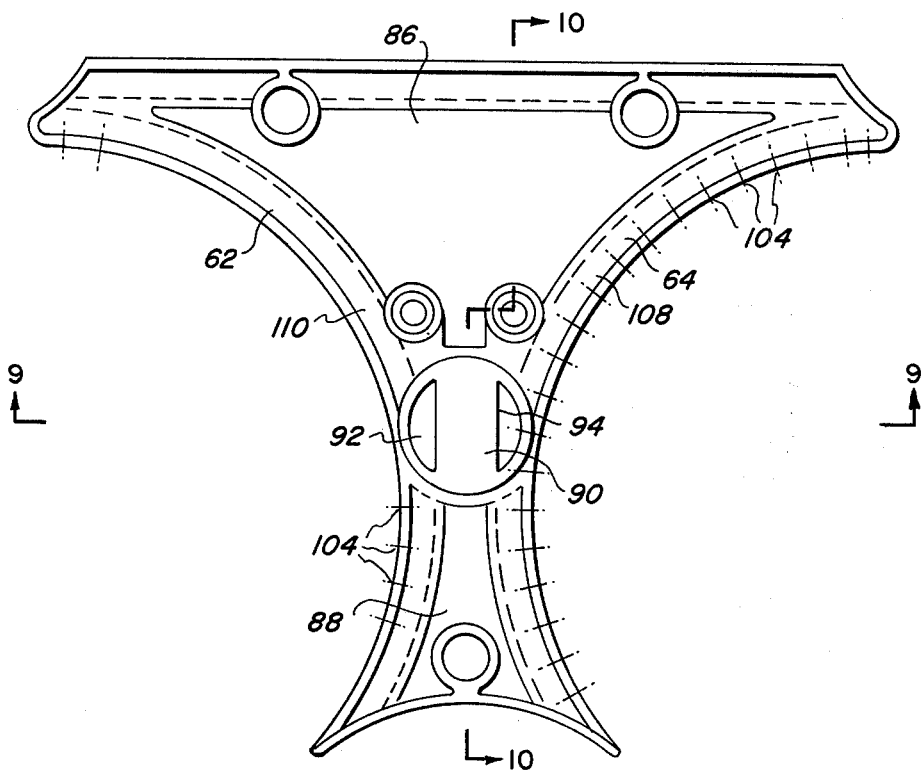
FIG. 7 is one half of the concave tape guide unit showing the construction details of the air channels internal to the unit.

As indicated above, the entire Concave Tape Guide Unit is composed of two Halves which are bonded together. FIG. 7 is a top view of one Half of the Concave Tape Guide Unit showing the internal construction of this unit. Small Channels 104 are provided in the surface of Concave Tape Guides 62 and 64. When the two Halves of the Concave Tape Guide Unit are bonded together these Channels become small Holes 104 from which compressed air emanates. These small Channels or Holes 104 communicate with a Compressed Air Channels 108 and 110 which communicate with compressed air Chambers 92 and 94 so that compressed air is supplied to the small Holes 104 in the Concave Tape Guide surface. Tube 90 communicates between Vacuum Chambers 86 and 88.

Figure 9:
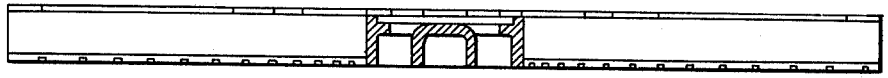
FIG. 9 is a cut-away end view of one half of the unit showing details of the air passages.
Figure 8:
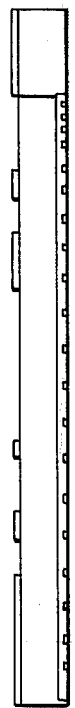
FIG. 8 is an end view of one half of the concave tape guide.
Figure 10:
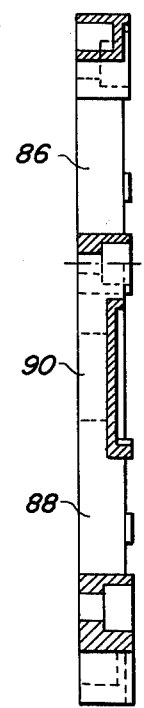
FIG. 10 is a cut-away side view of one-half of the concave tape guide unit showing the inner construction details.

FIG. 8 is a side view of one half of the Concave Tape Guide Unit and is identical to the left half of the Unit shown in FIG. 4. Likewise, FIG. 9 is the top half of the Unit shown in FIG. 5. FIG. 10 is a sectional end view of one half of the Concave Tape Guide Unit showing the internal construction details of the Tube 90 communicating with Vacuum Chambers 88 and 86.

It is to be understood that the above described arrangement is merely illustrative of the principles of the invention. For example, Concave Tape Guides may be produced individually instead of being combined into a single unit containing two Guides, and the dimensions and spacing of elements of a tape drive system using this invention may be varied to meet the objectives of a particular design. Further, this invention may be employed in any web feeding system where all system elements must contact the web on the same surface. While particular embodiments of the present invention have been described and illustrated it will be apparent to those skilled in the art that changes and modifications may be made therein without departure from the spirit and scope of the invention as claimed.

What is claimed is:

1. A symmetrical single capstan web feeding system in which all elements of said system contact the same surface of said web comprising:
    two circular guides for determining the web position and direction of motion, said circular guides and said web positioned with respect to each other so that the wrap of web about each guide effects a change in direction of web motion of greater than 90°,
    a vacuum capstan, one side of said capstan adapted to contact the portion of said web going toward said circular guides and the other side of said capstan adapted to contact the portion of said web coming from said circular guides, and
    two concave web guides for contacting the length of said web between each of said circular guides and each side of said capstan, each end of said concave web guide surface being tangential to the circumference of said circular guides and said capstan.

2. The apparatus of claim 1 wherein each of said concave web guides comprises:
    two parallel planes spaced apart a distance slightly greater than the width of said web and parallel to the direction of motion of all points on said web,
    a hollow body between said planes, one external surface of said body comprising a substantially circular concave cylindrical section with the cylinder axis perpendicular to said planes, said surface located near said web, and
    first apertures in said surface for producing a flow of air through said surface when air pressure is lower inside said body than outside to urge said web against said concave surface.

3. The apparatus of claim 2 including second apertures in said body surface for producing an air bearing between said body surface and said web when high pressure air is supplied to said second apertures.

4. In a single capstan symmetrical magnetic tape drive system of the type having reels for supplying and taking up tape for said system, and compliant devices for stabilizing the flow of tape to and from said reels wherein all elements of said system, except the read/write head, contact the non-oxide surface of said tape, the improvement comprising:
    two circular guides for positioning said tape in the proper spatial relation to said read/write head, the wrap of tape about each circular guide producing a change of greater than 90° in the direction of tape motion,
    a vacuum capstan, one side of said capstan adapted to contact the portion of said tape going to said circular guides and the other side adapted to contact the portion of said tape coming from said circular guides, and
    two concave tape guides for contacting the length of tape between each of said circular guides and each side of said capstan, each end of said concave tape guide surface being tangential to the circumference of said capstan and said circular tape guide.

5. The apparatus of claim 4 wherein each of said concave tape guides comprises:
    two parallel planes spaced apart a distance slightly greater than the width of said tape and parallel to the direction of motion of all points on said tape,
    a hollow body between said planes, one external surface of said body comprising a substantially circular concave cylindrical section with the cylinder axis perpendicular to said planes, said body surface located near said tape, and
    first apertures in said body surface for producing a flow of air through said body surface when air pressure is lower inside said body than outside to urge said tape against said concave body surface.

6. The apparatus of claim 5 including second apertures in said body surface for producing an air bearing between said body surface and said tape when high pressure air is supplied to said second apertures.

* * * * *